United States Patent [19]

Knorre et al.

[11] 4,280,914

[45] Jul. 28, 1981

[54] PROCESS FOR AUTOMATICALLY CONTROLLING THE DETOXIFICATION OF WASTE WATERS CONTAINING NITRITE IONS

[75] Inventors: Helmut Knorre, Seligenstadt; Joachim Fischer, Hanau, both of Fed. Rep. of Germany

[73] Assignee: Deutsche Gold- und Silber-Scheideanstalt vormals Roessler, Frankfurt, Fed. Rep. of Germany

[21] Appl. No.: 100,040

[22] Filed: Dec. 4, 1979

[30] Foreign Application Priority Data

Dec. 5, 1978 [DE] Fed. Rep. of Germany ....... 2852475

[51] Int. Cl.$^3$ ............................................... C02F 1/72
[52] U.S. Cl. .................................... 210/743; 210/759; 210/903
[58] Field of Search .................. 210/50, 51, 54, 63 R, 210/DIG. 28, 721, 724, 743, 759, 903

[56] References Cited

FOREIGN PATENT DOCUMENTS

| | | |
|---|---|---|
| 1959542 | 6/1971 | Fed. Rep. of Germany ... 210/DIG. 28 |
| 51-88863 | 8/1976 | Japan ............................................ 210/50 |
| 52-26760 | 2/1977 | Japan ............................... 210/DIG. 28 |
| 2027004 | 2/1980 | United Kingdom . |

*Primary Examiner*—Thomas G. Wyse
*Attorney, Agent, or Firm*—Cushman, Darby & Cushman

[57] ABSTRACT

In the detoxification of waste waters containing nitrite ions by means of hydrogen peroxide the addition of hydrogen peroxide is automatically controllable by adding the hydrogen peroxide continuously or in portions with continuous measurement of the pH and stopping the addition when no further reduction of the pH is caused by it. By control of the hydrogen peroxide addition through the change of the pH it is guaranteed that sufficient hydrogen peroxide is added to reach a complete detoxification of the waste water while on the other hand there is not wasted hydrogen peroxide unnecessarily.

13 Claims, No Drawings

PROCESS FOR AUTOMATICALLY CONTROLLING THE DETOXIFICATION OF WASTE WATERS CONTAINING NITRITE IONS

BACKGROUND OF THE INVENTION

The invention is directed to a process for automatically controlling the detoxification of waste waters containing nitrite ions, in which the nitrite ions are oxidized in the weakly acid pH range by means of hydrogen peroxide to form nitrate ions.

It has long been known that nitrite ions can be oxidized in the weakly acid pH range to nitrate ions by means of hydrogen peroxide. Although hydrogen peroxide represents a particularly environmentally favorable oxidizing agent, its use in practice failed in the detoxification of nitrite ions in waste waters of unknown or changing concentration because there existed no measuring technology for the oxidation reaction known in itself and consequently the reaction was not automatically controllable.

SUMMARY OF THE INVENTION

The process of the invention is characterized by adding the hydrogen peroxide continuously or in portions during the course of the oxidation while continuously (or successively) measuring the pH and stopping the addition when no further reduction of the pH is caused by it.

The process of the invention also makes possible the recognition of the end of the oxidation reaction with certainty in the detoxification of waste water containing nitrite ions in unknown concentration. As long as the waste water to be detoxified contains nitrite ions, the pH is lowered through the addition of hydrogen peroxide. The reduction of the pH takes place continuously if the hydrogen peroxide is added continuously, or in steps, if the hydrogen peroxide is added in portions. In any case, and entirely apart from the other reaction conditions, which perhaps influence the absolute position of the end pH, the lowering of the pH stops when practically all nitrite ions are oxidized to nitrate ions. Independent of the absolute state of the end pH the further addition of hydrogen peroxide then no longer causes a further reduction of the pH. The continuous measurement of the pH during the course of the oxidation reaction consequently opens up the possibility for the automatic control of the hydrogen peroxide addition and guarantees that indeed sufficient hydrogen peroxide is added to attain a complete detoxification of the waste water, while on the other hand there is not wasted hydrogen peroxide unnecessarily.

Since the oxidation of the nitrite ions just commences in the weakly acid pH region it is suitable in many cases, especially if the concentration of nitrite ions is relatively small, to first adjust the waste water to be detoxified to a pH of 4.0 or below, preferably to a pH of 3.7 and only then to begin the addition of the hydrogen peroxide.

In other cases, particularly if the concentration of nitrite ions is relatively high, however, there exists the danger in this method of operation that larger amounts of nitrogen oxides are set free. Therefore it is advantageous in these cases to add to the waste water to be detoxified a part of the hydrogen peroxide necessary for the complete oxidation of the nitrite ions contained in the waste water at a pH above 4.0, preferably at about pH 7.0, then to reduce the pH to 4.0 or below and to add the remainder of the necessary hydrogen peroxide continuously or in portions. In this method of operation it can occasionally occur that during the adjustment of the pH on account of local over-acidification at the place of addition of the acid the oxidation reaction already commences before a pH of 4.0 or below is reached in the entire waste water to be detoxified. Moreover since through the oxidation reaction the pH is reduced the consumption of additional acid for establishing the pH value is less than when the pH is first adjusted and then hydrogen peroxide is added subsequently. The lesser consumption of additional acid in this case thus causes the absolute end pH value to be somewhat higher than in the other method of operation. However, in this case also the detoxification is practically complete when the further addition of hydrogen peroxide causes no further reduction of the pH.

The industrial measuring evaluation of the pH change is facilitated in the process of the invention if there is employed hydrogen peroxide of higher concentration, preferably between 30 and 50 percent by weight. Insofar as the hydrogen peroxide is added in portions, it is further more advantageous if per individual addition at least 0.1 gram of hydrogen peroxide (calculated as 100%) per liter reaches the waste water to be detoxified. Usually in each portion there is not added over 0.5 grams of hydrogen peroxide per liter.

For the continuous measurement of pH there can be used all commercial pH measuring apparatus. The automatic control of the portionwise addition of the hydrogen peroxide can take place advantageously in such manner that for each time controlled period of addition there follows a time controlled period of observation. The pH value measured at the end of the period of observation then serves in each case as reference point for the next period of observation. If no more change of the pH is caused by the next addition of hydrogen peroxide, the further addition of hydrogen peroxide is stopped.

The process of the invention is further explained in the following examples. If not otherwise stated all percentages are by weight.

The process can comprise, consist essentially of or consist of the steps set forth and the materials employed can comprise, consist essentially of or consist of those set forth.

DESCRIPTION OF THE PREFERRED EMBODIMENTS

EXAMPLE 1

1 liter of a sodium nitrite solution containing 15 grams of $NO_2^-/l$ and an initial pH of 6.8 was first slowly adjusted to pH 3.75 with 9 ml of dilute sulfuric acid (1:4 dilution; about 30% $H_2SO_4$). Then there was metered into this acidified solution at about 22° C. with stirring hydrogen peroxide (35% $H_2O_2$) until the pH of the solution remained constant at 1.45. For this there were needed 28 ml of $H_2O_2$ which corresponds to 100% of theory, based on the starting content of $NO_2^-$. The colorimetric control of the detoxification results by means of sulfanilic acid and naphthylamine showed that the nitrite content of the solution was reduced to <1 mg $NO_2^-/l$.

EXAMPLE 2

5 liters of a solution containing 15 grams of $NO_2^-/l$ and a pH of 6.8 were first treated at room temperature (approximately 22° C.) with 130 ml of hydrogen peroxide (35% $H_2O_2$) and subsequently the pH of the solution slowly reduced with dilute sulfuric acid (1:4 dilution; about 30% $H_2SO_4$). At a pH of approximately 4.3 the oxidation reaction started through local over acidification at the place of addition of the sulfuric acid and caused a sudden drop to pH 3.0. (In contrast to Example 1 in which 45 ml of dilute sulfuric acid/5 l solution was necessary, here there were only required in all 12 ml of sulfuric acid.) Then for the oxidation of the residual nitrite there was added the hydrogen peroxide (35% $H_2O_2$) in portions of 4 ml in each case at intervals of 1 minute in each case until the pH remained constant at 1.85. For this in all there were needed 146 ml of $H_2O_2$ which corresponds to 104% of theory, based on the starting content of nitrite. Also in this case the result of colorimetric control showed that the nitrite content was reduced to <1 mg $NO_2^-/l$.

EXAMPLE 3

4 liters of a neutral sodium nitrite solution having a nitrite content of 5 grams $NO_2^-/l$ were first adjusted with dilute sulfuric acid (1N-$H_2SO_4$) to pH 3.7 and subsequently there was added hydrogen peroxide (50% $H_2O_2$) in portions of 2 ml in each case in an interval of 1 minute in each case until the pH is no longer changed at 2.15. For this there were needed 26 ml of $H_2O_2 = 105\%$ of theory, based on the starting content of nitrite. The nitrite content could be reduced to <1 mg $NO_2^-/l$.

EXAMPLE 4

4 liters of neutral sodium nitrite solution having a content of 2.5 grams of $NO_2^-/l$ were first adjusted at room temperature (about 22° C.) with dilute sulfuric acid (1N-$H_2SO_4$) to pH 3.7 and subsequently there was added hydrogen peroxide (50% $H_2O_2$) in portions in each case of 2 ml in an interval in each case of 1 minute until the pH of the solution no longer changed at 2.45. For this there were needed 14 ml of $H_2O_2 = 113\%$ of theory, based on the starting content of nitrite. The nitrite content could be reduced to <1 mg $NO_2^-/l$.

EXAMPLE 5

4 liters of a neutral sodium nitrite solution with a content of 0.5 grams $NO_2^-/l$ were first adjusted to pH 3.75 with dilute sulfuric acid (1N-$H_2SO_4$) and subsequently there was added hydrogen peroxide (50% $H_2O_2$) in portions of 1 ml in each case at intervals of 1 minute until the pH, after the fourth addition, no longer changed at 2.8. The addition of 4 ml of $H_2O_2$ in all corresponds to about 160% of theory, based on the starting content of nitrite. The nitrite content could be reduced to <0.1 mg $NO_2^-/l$.

EXAMPLE 6

4 cubic meters of waste water from a hardening shop (from the treatment of steel) with a content of 7.2 grams of $NO_2^-/l$ and a pH of about 10 were first adjusted to pH 3.7 with dilute sulfuric acid (approximately 27% $H_2SO_4$). Subsequently there was added aqueous hydrogen peroxide (35% $H_2O_2$) in portions of 10 liters in each case in time intervals of 2-3 minutes until the pH value at further addition of $H_2O_2$ no longer was reduced; this was the case after an addition of 60 liters of $H_2O_2$ and at an end pH of 1.8. The amount of $H_2O_2$ added corresponded to 111% of theory, based on the starting content of nitrite. The residual content of nitrite ions of <1 mg $NO_2^-/l$ ascertained with a nitrite test strip was able to be subsequently confirmed in the laboratory by colorimetric control.

EXAMPLE 7

4.2 cubic meters of waste water from a hardining shop having a content of 23 grams $NO_2^-/l$ and a pH of approximately 10 were first adjusted to pH 7 with dilute sulfuric acid (approximately 27% $H_2SO_4$). Then there were added to the waste water 130 liters of 35% hydrogen peroxide and subsequently the pH was reduced to about 3.7 by further addition of sulfuric acid. Thereby the oxidation of the nitrite commenced. For the complete oxidation of the nitrite still present at this time there was then added $H_2O_2$ (35%) in portions of 10 liters in each case at intervals of 2-3 minutes in each case until no change in pH could be detected by a further addition of $H_2O_2$. This was reached at a final pH of 1.8 and an addition in all of 200 liters of $H_2O_2$. This corresponds to an addition of 111% of theory based on the starting content of nitrite. The residual content of nitrite was <1 mg $NO_2^-/l$.

EXAMPLE 8

1.2 cubic meters of waste water from a hardening shop having a content of 3.3 grams $NO_2^-/l$ and a pH of 9 were first acidified with dilute sulfuric acid (approximately 27% $H_2SO_4$) to pH 3.7. Then there were added to the waste water hydrogen peroxide (50% $H_2O_2$) in portions of 400 ml in the interval of 1 minute until no further pH drop took place through further addition of $H_2O_2$. This was the case at a final pH of 2.8. The analytical examination in this case also showed that the nitrite content was reduced to <1 mg $NO_2^-/l$.

The entire disclosure of German priority application No. P 28 52 475.6-41 is hereby incorporated by reference.

What is claimed is:

1. In a process for the detoxification of nitrite ion containing waste water by oxidizing the nitrite ions to nitrate ions in the weakly acid pH range by means of hydrogen peroxide the improvement comprising automatically controlling the detoxification by successively measuring the pH and stopping the addition of hydrogen peroxide when there is no longer a reduction in the pH upon the addition of more hydrogen peroxide.

2. The process of claim 1 wherein the hydrogen peroxide is added continuously.

3. The process of claim 1 wherein the hydrogen peroxide is added in successive portions.

4. The process of claim 1 wherein the waste water to be detoxified has a pH of above 4 and then is adjusted to a pH of not above 4.0 before the initial addition of hydrogen peroxide.

5. The process of claim 1 wherein the waste water to be detoxified has a pH of above 4 a first portion of the hydrogen peroxide necessary for the complete oxidation of the nitrite ions present is added at said pH above 4, then the pH is reduced to a pH of not above 4.0 and then the remainder of the hydrogen peroxide required for the complete oxidation is added.

6. The process of claim 5 wherein said remainder of the hydrogen peroxide is added continuously.

7. The process of claim 5 wherein said remainder of the hydrogen peroxide is added in portions.

8. The process of claim 5 wherein the pH at the time of the addition of said first portion of hydrogen peroxide is about 7.0.

9. The process of claim 5 wherein the hydrogen peroxide is added in portions such that there is added in each portion at least 0.1 gram of hydrogen peroxide, calculated as 100%, per liter of waste water to be detoxified.

10. The process of claim 4 wherein the hydrogen peroxide is added in portions such that there is added in each portion at least 0.1 gram of hydrogen peroxide, calculated as 100%, per liter of waste water to be detoxified.

11. The process of claim 1 wherein the hydrogen peroxide is added in portions such that there is added in each portion at least 0.1 gram of hydrogen peroxide, calculated as 100%, per liter of waste water to be detoxified.

12. The process of claim 11 wherein the portionwise addition of the hydrogen peroxide is controlled electronically in such manner that for each time controlled period of addition there follows a time controlled period of observation, the pH value measured at the end of the period of observation serving in each case as a reference point for the next period of observation.

13. The process of claim 1 wherein the waste water to be detoxified has a pH of above 4 and then is adjusted to a pH of 3.7 before the initial addition of hydrogen peroxide.

* * * * *